(12) United States Patent
Pionetti

(10) Patent No.: US 8,555,930 B2
(45) Date of Patent: Oct. 15, 2013

(54) ASSEMBLY OF COAXIAL PIPES INCLUDING JUNCTION PARTS WITH SEALED INNER CAVITIES, AND METHOD FOR MAKING SAME

(75) Inventor: François-Régis Pionetti, La Baleine (FR)

(73) Assignee: Saipem S.A., Montigny le Bretonneux (FR)

(*) Notice: Subject to any disclaimer, the term of this patent is extended or adjusted under 35 U.S.C. 154(b) by 49 days.

(21) Appl. No.: 13/383,364

(22) PCT Filed: Jul. 1, 2010

(86) PCT No.: PCT/FR2010/051380
§ 371 (c)(1),
(2), (4) Date: Mar. 7, 2012

(87) PCT Pub. No.: WO2011/007075
PCT Pub. Date: Jan. 20, 2011

(65) Prior Publication Data
US 2012/0192985 A1 Aug. 2, 2012

(30) Foreign Application Priority Data
Jul. 17, 2009 (FR) ...................................... 09 54966

(51) Int. Cl.
*F16L 9/00* (2006.01)

(52) U.S. Cl.
USPC ........... 138/109; 138/112; 138/114; 138/148; 138/155

(58) Field of Classification Search
USPC ........................... 138/112, 114, 109, 148, 155
See application file for complete search history.

(56) References Cited

U.S. PATENT DOCUMENTS

| 4,560,188 | A  | * | 12/1985 | Berti et al. | ...................... | 285/47 |
| 7,722,088 | B2 | * | 5/2010 | Pionetti | ...................... | 285/123.3 |
| 7,793,992 | B2 | * | 9/2010 | Pionnetti | ................... | 285/288.1 |
| 2008/0149210 | A1 | * | 6/2008 | Pionetti | ......................... | 138/144 |
| 2010/0230953 | A1 | * | 9/2010 | Baylot et al. | ................ | 285/120.1 |
| 2010/0282353 | A1 | * | 11/2010 | Baylot et al. | ................ | 138/114 |

FOREIGN PATENT DOCUMENTS

EP 1 771 679 4/2007
GB 2 396 196 6/2004

OTHER PUBLICATIONS

International Search Report dated Oct. 7, 2010.

* cited by examiner

*Primary Examiner* — James Hook
(74) *Attorney, Agent, or Firm* — Cozen O'Connor

(57) ABSTRACT

An assembly of at least two coaxial pipes having at least two coaxial pipe assembly unit elements, one of which has, at one end, a first junction part assembled to a second junction part at the end of another said coaxial pipe assembly unit element, each of said first and second junction parts being a body of revolution, wherein the ends of the two non-welded-together inner second branches of said first and second junction parts are in metal-on-metal contact one on the other under elastic deformation stress via their contact surface as a result of the shrinking of the weld between the ends of the two outer second branches of the junction parts, such that the inner second cavities are leaktight relative to the inside of the inner pipe.

10 Claims, 6 Drawing Sheets

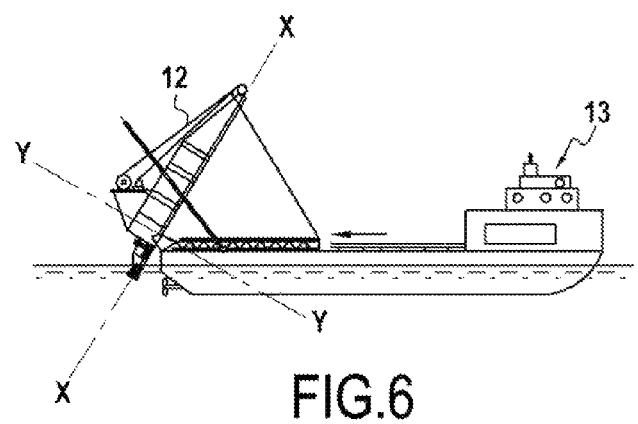
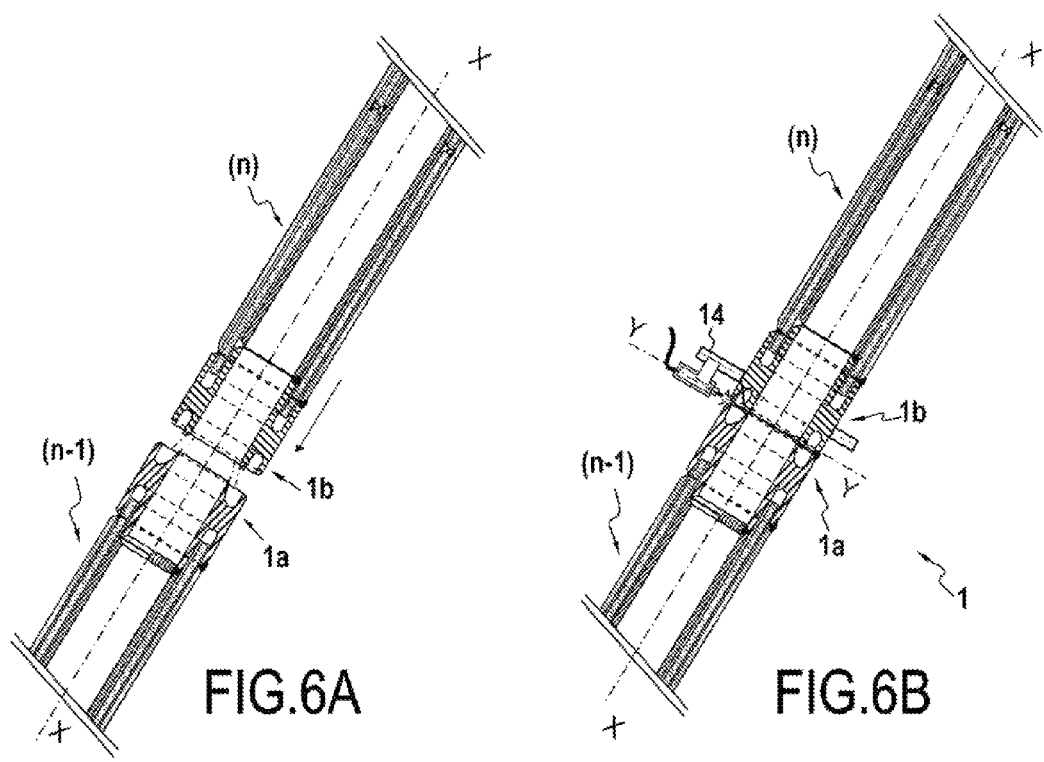
FIG.6
FIG.6A
FIG.6B

ASSEMBLY OF COAXIAL PIPES INCLUDING JUNCTION PARTS WITH SEALED INNER CAVITIES, AND METHOD FOR MAKING SAME

PRIORITY CLAIM

This is a U.S. national stage of application No. PCT/FR2010/051380, filed on Jul. 1, 2010. Priority is claimed on the following application: France Application No. 0954966 filed on Jul. 17, 2009, the content of which is incorporated here by reference.

FIELD OF THE INVENTION

The present invention relates to the field of double-walled pipes including an insulating complex, in particular undersea pipes for conveying hot or cold fluids.

The present invention relates in particular to undersea pipes having reinforced insulation, as installed on oil fields at great depths, and also to pipes that are suspended between the sea bottom and a surface ship anchored over said oil field.

More precisely, the present invention relates to a cylindrical junction part for joining together two coaxial pipe assembly elements each comprising two pipes: an outer pipe and an inner pipe, the pipes defining between them an annular space that preferably contains lagging material.

The present invention also relates to a method of joining together two elements each constituted by an assembly of two coaxial pipes and having junction parts of the invention at their ends.

BACKGROUND OF THE INVENTION

In most industrial fields, it is desirable to have high-performance insulation systems to ensure that fluids being conveyed in pipework are maintained at constant temperature so that transfers between pieces of equipment can be made possible over considerable distances, e.g. as much as several hundreds of meters, or even several kilometers. Such distances are commonplace in industries such as oil refineries, liquefied natural gas installations (at −165° C.), and undersea oil fields that extend over several tens of kilometers. Such oil fields are being developed in depths of water that are becoming ever deeper, and can be at depths considerably greater than 3000 meters (m).

Numerous systems have been developed for reaching a high level of thermal performance, and specific versions have been developed to accommodate great depths as appropriately as possible, i.e. to be capable of withstanding pressure at the bottom of the sea. The highest performance technologies that have been developed for achieving this objective are so-called pipe-in-pipe (PiP) technologies in which an inner pipe conveys the fluid, and an outer pipe disposed coaxially around the inner pipe comes into contact with the surrounding medium, i.e. water. The annular space between the two pipes can be filled with lagging material, or it can be evacuated so as to be free of gas.

In this type of pipe, the annular space, whether or not filled with lagging material, is generally at an absolute pressure that is lower than atmospheric pressure, and it might be completely evacuated, so to a first approximation, the inner pipe can be considered as radially withstanding the bursting pressure due to the internal fluid, while the outer pipe withstands implosion created by the hydrostatic pressure (pgh) at the sea bottom, which pressure is about 1 megapascal (MPa) per 100 m of depth of water, i.e. 30 MPa at a depth of 3000 m. The axial effect due to pressure, referred to as the "bottom" effect, acts on the circular section of the pipe and parallel to the axis of said pipe, and is shared, to a first approximation, by both pipes (since they are connected together at their ends), pro rata the respective sections of their materials, generally steel.

For installations for use at great depth, undersea pipes and undersea coaxial pipe assemblies are assembled on land to constitute elements having a unit length of the order of 20 m to 100 m, depending on the support capacity of the laying system. They are then transported in this configuration out to sea on a pipe-laying ship. During laying, the unit lengths of the various coaxial pipe assembly elements are connected to one another on board the ship progressively as laying proceeds. It is therefore important to be able to integrate making the connections in the process for constructing the pipe and laying it on the sea bottom, while slowing the process down as little as possible so that it can be performed quickly and easily.

While laying a conventional PiP in great depth, by way of comparison or as described in this patent, said PiP is subjected to bending, mainly in its bottom portion close to the sea bed. Bending is at a maximum at the point of contact with the sea bed since the radius of curvature decreases from the surface down to the point of contact with the sea bed where it is at its minimum, with the PiP thereafter resting substantially horizontally on the bottom of the sea and presenting a radius of curvature that is infinite. The bending that occurs during laying creates high levels of stress in each of the tubes of the PiP and in the connection zone between two successive lengths of PiP.

For this purpose, use is made of junction parts or connection parts that are made of forged steel and that are assembled to the ends of said coaxial pipe assembly elements for joining together. The junction part at the downstream end of a first coaxial pipe assembly element that has not yet been joined is connected to the junction part at the upstream free end of a second coaxial pipe assembly element that has already been joined at its downstream end.

Patents GB-2 161 565 and GB-2 191 842 describe a PiP and its method of assembly, and also two methods of making forged connection or junction parts.

One of the shortcomings of the junction forgings proposed in those prior patents lies in the connection zones of said junction parts, since the diameter of the parts is reduced and corresponds substantially to the diameter of the inner pipe. As a result there is a very significant change in the second moment of area "inertia" of the cross-section of the PiP between the main or intermediate zone of said PiP and said end or connection zone between two of said unit lengths of PiP, which leads to a point of weakness being created at each of these welded connections between two forgings, the zone of said welding then being particularly sensitive to fatigue phenomena, both during laying and during the lifetime of the pipe.

To avoid having such a zone of weakness and to conserve a substantially constant inertia for the cross-section, it is possible to increase the wall thickness of the forging over the entire zone situated between the solid portion of said forging and the chamfered zone where welding is performed. However it is then necessary substantially to double said thickness. For pipes of large diameter that are to be laid at great depths, welding becomes problematic because of the very great thickness of steel, since said thickness can be as great as 40 millimeters (mm) to 50 mm, thus requiring welding techniques that are very difficult to perform, and indeed in some circumstances practically impossible to perform without including defects, given the dynamic effects that can be applied to the mass of molten steel while at sea. In addition, since said welding is performed on board pipe-laying ships, which ships present extremely high hourly costs, the cost of an installation becomes prohibitive, and the risks of failure are considerable because of the complexity of said on-site welding operations.

In EP-1 771 679 in the name of the Applicant, it has been proposed to connect together unit lengths of a PiP type coaxial pipe assembly that is improved so as to facilitate implementing the connection means and the operations of making a connection, particularly by optimizing laying equipment, and in which the connection zones between two unit lengths are reinforced so that the stresses generated during laying are minimized and so that fatigue behavior for bottom-surface connections is greatly improved.

To do this, in EP-1 771 679, provision is made for a circularly symmetrical junction part for joining together two elements of an assembly of at least two coaxial pipes, the assembly comprising an outer pipe containing an inner pipe defining an annular space preferably containing a lagging material, said junction part being characterized in that it is defined as follows:

in a radial direction relative to a longitudinal axis XX' of symmetry of said part, it is defined by a cylindrical inner wall of substantially the same diameter as the intermediate portion of said inner pipe, and by a cylindrical outer wall of diameter substantially equal to the outside diameter of the intermediate portion of said outer pipe; and in the direction of the longitudinal axis XX':

on the end of said junction part that is to be connected by welding to the ends of said outer and inner pipes of a said element of an assembly of at least two coaxial pipes, said outer and inner walls of said junction part forming in longitudinal section respective outer and inner first branches of substantially the same thickness as said outer and inner pipes to which they are to be connected, said outer and inner first branches defining a first annular cavity; and at the opposite end of said junction part that is to be joined to another said junction part, itself connected by welding to the end of another element of an assembly of two coaxial pipes, said outer and inner walls forming in longitudinal section respective outer and inner second branches defining a second annular cavity;

the bottoms of said first and second cavities being spaced apart in said longitudinal direction XX' so as to define a solid zone of said junction part in which said outer and inner walls form the outer and inner faces of a single cylindrical wall.

A junction part of this type is constituted by a single metal forging, i.e. it is made as a single piece, preferably of steel, and more preferably of a steel alloy.

In EP-1 771 679 provision is also made for an assembly of at least two coaxial pipes constituted in its intermediate portion by an outer pipe and an inner pipe defining an annular space, preferably containing lagging material, the assembly comprising:

at at least one of its ends a junction part as defined above, connected thereto by welding via the ends of said outer and inner first branches and the same-thickness ends of said outer and inner pipes, respectively;

one of said inner and outer first branches of said junction part presenting an end that projects relative to the end of the other first branch by a length that is suitable for matching the length of said inner and outer pipes relative to each other at the ends of said elements of said coaxial pipe assemblies; and said first annular cavity is preferably filled with a said lagging material.

A method of joining together two elements of an assembly of at least two coaxial pipes, as defined above, comprises the following steps:

1) joining a said first coaxial pipe assembly element as defined above, having a first said junction part as defined above, at its downstream end to a second said coaxial pipe assembly element as defined above, having a second said junction part at its upstream end, said two outer second branches of said first and second junction parts preferably being of the same thickness; and 2) bringing together and welding together only the free ends of said outer second branches of said first and second junction parts of said two elements of an assembly of at least two coaxial pipes to be joined together.

Forming said first and second annular cavities serves firstly to establish continuity in terms of the inside diameter of the inner pipe, and secondly to provide relative continuity and identical "inertia" for the cross-section both of the intermediate or main zone of the PiP and of the connection zone, the thickness of the outer branch of the forged junction part being substantially equal to or slightly greater than the thickness of the intermediate portion of the outer pipe.

The separation between the ends of said outer and inner first branches and the bottom of the first cavity, and the separation between the end of said second outer branch and the bottom of the second cavity make it possible to perform welding under better conditions, since the masses of steel on both sides of the welding zone are substantially equal, and the welding zone is then no longer disturbed by a "radiator" effect caused by the solid and massive zone situated between the bottoms of said first and second cavities, where said disturbance consists in unbalanced cooling between the left and right sides of the welding zone.

Finally, the continuity in the diameter of the outer wall along said junction part and relative to the outside diameter of the intermediate portions of the outer pipes makes it possible to create a considerable increase in the "inertia" of the cross-section in the connection zone between two adjacent junction parts, thereby reinforcing the connection, precisely where stresses are at a maximum. The "inertia" of the cross-section of a pipe about its center varies with the fourth power of its radius, which leads to a considerable thickness being necessary in the prior art as described in GB-2 161 565 or GB-2 191 942. In contrast, when the cross-section in question is that of the outer pipe of the PiP, the thickness required is greatly reduced, and even under certain circumstances divided by two, thereby considerably simplifying assembly operations by welding performed on board installation ships under conditions that can be difficult.

Furthermore, the fact that the two adjacent junction parts are welded together only via the ends of said outer second branches, enables all of the load transfer and stress phenomena to be localized in the outer level without involving said inner walls, thereby making it possible to have better control over the risks of cracking or fatigue phenomena and to avoid the device collapsing completely at the inner wall.

In addition, the fact that the two ends of said inner second branches of two joined-together adjacent junction parts of the invention are not welded together, serves to accommodate small movements between said facing inner walls due to possible bending or variations in pressure or temperature, and allows said inner walls to deform plastically, since it is possible for said inner second branches to be upset without any risk of transferring contact compression loads, thus making it possible to avoid disturbing the distribution of stresses in the assembly zone with the major portion of the stresses being transferred via the outer walls of said parts.

The formation of said cylindrical inner wall that ensures almost complete continuity with the inner pipe makes it possible to avoid vortex type turbulence phenomena in the flow of fluid inside the device after elements have been joined together and on going past the join between two said junction parts of two adjacent portions of PiP.

All of these characteristics contribute to greatly improving behavior in bending, and also in fatigue, of a device involving two elements of a coaxial assembly fitted with said junction parts and connected together on board installation ships.

Furthermore, said junction parts can be manufactured and connected relatively easily and reliably both concerning joining together two adjacent junction parts, and concerning the connection of a junction part with one end of an assembly of at least two coaxial pipes.

In an advantageous embodiment of EP-1 771 679, said inner second branch includes on its end face at its free end and extending in the longitudinal direction, a male or female centering element suitable for co-operating with a female or male element at the free end of a said other inner second branch of another said junction part to which it is to be joined, in such a manner as to:

provide a centering effect between two junction parts when they are brought together in order to be joined together; and adjust the spacing e, where e is equal to 1 mm to 5 mm, preferably 2 mm to 4 mm, between the end faces of said outer second branches of said junction parts to be joined together while they are being brought together for joining purposes so that, preferably, joining can be performed by welding and said welding can be implemented over the entire thickness of said end faces of said outer second branches that are to be joined together.

In another advantageous embodiment, in EP-1 771 679, the thickness of said inner second branch of one of the two junction parts joined together end-to-end tapers between the bottom of said second annular cavity and said end face of said inner second branch, the surface of said inner second branch thus being inscribed in a frustoconical envelope, and said inner second branch presents reduced stiffness relative to the inner second branch of the other junction part to which it is joined.

This inner wall that tapers in said inner second branch can act as an optional abutment while facilitating plastic deformation and potential upsetting during bending movements or variations in pressure or temperature, with the major fraction of the stresses being transmitted almost completely via said outer second branch.

As a result of this, in EP-1 771 679, after the two junction parts have been joined together, said second cavity is not sealed off from the inside of said inner wall and said internal pipe, since when a fluid begins to flow inside it, the fluid migrates into the second cavity, with overall sealing of the PiP pipe being provided by the outer weld between the ends of said outer second branches, so the fluid becomes trapped in said second cavity throughout the lifetime of the installation.

In order to obtain an optimum centering effect, EP-1 771 679 describes an embodiment in FIG. 2E in which the surfaces of said two inner second branches co-operating with each other by making contact during joining of the two junction parts are inscribed in a common frustoconical envelope, said two inner branches co-operating by making contact having the same "inertia" and thus the same stiffness, with their contact surfaces during assembly and after welding of the outer second branches coinciding with their overlap surfaces along the longitudinal axis XX', which is at least greater than half the length of said inner second branches.

Because of this relatively large-area contact surface between said two inner second branches, coinciding with their overlap zones, the initial elastic deformation stress in said metal-on-metal contact surface is insufficient and/or not uniform over the entire surface, thereby giving rise to leakage paths and to a lack of leaktightness for said second cavities, in that embodiment also.

SUMMARY OF THE INVENTION

According to the present invention, it has been found that large-area contact surface and the absence of elastic deformation at the ends of said inner second branches that are co-operating by making contact is harmful during the shrinkage of the weld while it cools between the ends of said outer second branches, and in any event gives rise to traction stresses on said welds between said outer second branches of the two junction parts, which stresses run the risk of having a negative effect on the fatigue behavior of the welds and on its mechanical reliability over time.

Furthermore, in the present invention, it has been found that, during operation of the installation, the confinement of undesirable corrosion substances, such as brine and more particularly water coming from wells and carrying a variety of bacteria, runs the risk of producing compounds that are aggressive for the installations in said annular second cavities and in particular at said welds between the ends of said outer second branches of two joined-together junction parts, which can lead to undesirable localized incidents of corrosion.

The object of the present invention is to provide improved junction parts and an improved joining of junction parts that makes it possible to overcome the above-mentioned drawbacks.

To do this, the present invention provides an assembly of at least two coaxial pipes constituted in a main portion by an outer pipe and an inner pipe defining an annular space preferably containing lagging material, the assembly being constituted by assembling together unit elements of at least two coaxial pipes, comprising at least two coaxial pipe assembly unit elements, one of which has, at at least one end, a first junction part joined to a second junction part at the end of another said coaxial pipe assembly unit element, each of said first and second junction parts being a body of revolution defined as follows:

in a radial direction relative to a longitudinal axis XX' of symmetry of said part, it is defined by a cylindrical inner wall of substantially the same diameter as the intermediate portion of said inner pipe, and by a cylindrical outer wall of diameter substantially equal to the outside diameter of the intermediate portion of said outer pipe; and in said direction of the longitudinal axis XX':

on the end of said junction part that is joined by welding to the ends of said outer and inner pipes of a said unit element of an assembly of at least two coaxial pipes, said outer and inner walls of said junction part forming first branches in longitudinal section, preferably respective first outer and inner branches of substantially the same thickness as said outer and inner pipes to which they are connected, said outer and inner first branches defining a first annular cavity; and at the opposite end of said junction part where it is joined to another said junction part, itself connected by welding to the end of said another unit element of an assembly of two coaxial pipes, said outer and inner walls forming in longitudinal section respective outer and inner second branches defining an internal second annular cavity;

the two said first and second junction parts being welded to each other solely via the ends of their said outer second branches;

preferably, the bottoms of said first and second cavities being spaced apart in said longitudinal direction XX' so as to define a massive solid zone of said junction part in which said outer and inner walls form the outer and inner faces of a single cylindrical wall; and the ends of said two non-welded-together inner second branches of said first and second junction parts are in metal-on-metal contact with each other under elastic deformation stress via their contact surface, which is a preferably-conical surface of revolution, between an outer first surface of revolution on the outer face of the inner second branch of the first junction part and an inner second surface of revolution on the inner face of the inner second branch of the second junction part, said inner second branch of the first junction part forming a male inner second branch situated inside the female inner second branch of the second junction part, the assembly being characterized in that said inner second surface of revolution is of a shape that is different, but of the same axis of revolution (XX') as the outer first surface of revolution, such that said outer first surface of revolution and inner second surface of revolution present, when they are arranged coaxially and engaged in contact one against the other, an initial line of contact that is circular and that transforms into said contact surface after said elastic deformation stress resulting from the elastic deformation due to the shrinkage of the weld between the ends of said outer second branches of said two junction parts, so that said internal second cavities are leaktight relative to the inside of the inner pipe.

It should be understood that the term "initial line of contact that is circular" means that in axial longitudinal section XX' the contact between the two surfaces is at point width and forms a line that is circular in cross section in the YZ plane while the two pipes are moving closer together before welding. The shrinkage of the weld then transforms this line into a contact surface of revolution by elastic deformation that then leads to the looked-for metal-on-metal sealing.

The term "inner" is used herein to mean a branch or a surface that is closer to the inside of the inner pipe of the PiP, and the term "outer" is used to mean a surface or a branch that is closer to the outside of the outer pipe of the PiP. Thus, said outer first surface of revolution faces towards said angular second cavity, and said inner second surface of revolution faces towards the inside of said inner pipe.

Thus, the present invention proposes, in original manner, to establish sealing in said second inner cavities, with this being made possible by creating contact under the stress of elastic deformation between the surfaces of said two facing inner branches, which elastic deformation stress makes it possible for the shrinkage of the weld at the ends of said outer second branches to take place correctly.

Means for detecting elastic deformation stress are known to the person skilled in the art, such as the X-ray method, which makes it possible to measure inter-atomic distances at the surface of the material, and thus to characterize very accurately the state and the level of stress, whether in traction, at rest, or in compression. Such means are available from the Finnish supplier Stresstech.

It can be understood that:

one of said inner second branches is in elastic deformation stress under traction, while the other is in elastic deformation stress in compression in said contact zone;

the elastic deformation in said contact surface must not be excessive, so as to conserve a spacing between the ends of said outer second branches prior to making the welds, in such a manner that these ends of the outer second branches can be joined together over the entire thickness of their facing front end faces; and the clamping of the two junction parts against each other takes place as a result of the shrinkage of the weld at the ends of said outer second branches, on cooling.

Because of said first and second surfaces of revolution are coaxial and because their initial circular line of contact of point-width transforms, after elastic deformation stress, into a preferably-conical contact surface of revolution when the two junction parts approach each other, there is an effect of the two junction parts being automatically centered and of the joined-together strings n and n−1 being accurately aligned, and there is also accurate and repeatable provision of a space "e" between the end front faces of the outer branches of the two junction forgings, thereby contributing to the welds between said front faces of the outer branches of the two junction parts being made under perfect conditions.

In a preferred embodiment:

said inner second branch of said first junction part forms a male inner second branch inside the female inner second branch of the second junction part, and said male inner second branch is of stiffness that is less than the stiffness of the female inner second branch; and said outer first surface of revolution and said inner second surface of revolution are in metal-on-metal contact resulting from elastic deformation on a said contact surface, which surface presents a dimension in projection onto the axial longitudinal direction that is less than the dimension in projection onto the axial longitudinal direction of the overlap zone between said male inner second branch and said female inner second branch.

The term "surface of revolution" is used to cover a surface of revolution of any shape that presents in axial longitudinal section in the axisymmetrical direction XX' of the pipe a shape that may be parabolic, hyperbolic, or ellipsoidal, that is preferably circular, said surfaces of revolution possibly being ellipsoids, and in particular spheres, in particular paraboloids or hyperboloids and surfaces constituting frustoconical envelopes.

Because of the relatively small size of said contact surface, the elastic deformation stress that occurs therein is sufficient to give rise to metal-on-metal sealing of said inner second cavity as a result of the shrinkage of the welding at the ends of said second outer branches of the two junction parts during cooling of said welds.

And because said male inner second branch presents lesser stiffness, it can be understood that said elastic deformation stress occurs essentially in said male inner second branch and more precisely in said outer first surface of revolution.

Implementing a male inner second branch of smaller stiffness on the inside of the inner pipe relative to said female inner second branch enables the pressure of the fluid inside said inner pipe of the PiP to act against said less rigid inner second branch, thereby pressing against and being supported by said more rigid female inner second branch, thereby firstly avoiding deformation of said male second branch towards the inside of said second annular cavity, and thus secondly avoiding the loss of sealing of said inner second cavity that would result therefrom. It is necessary for said stiffer inner second branch to be beside the inner second cavity firstly to encourage elastic deformation of said inner second branch arranged beside the inner pipe (referred to as the "male inner second branch") allowing the welds to shrink without loss of sealing via the inner second cavity.

It can be understood that if both inner branches are made of the same material, the reduction in stiffness is obtained by a reduction in thickness.

More particularly, the length of the generator line of said contact surface of revolution between said outer first surface of revolution and said inner second surface of revolution lies in the range 0.5 mm to 5 mm, and preferably in the range 2 mm to 4 mm.

To make a said contact zone of smaller dimensions, embodiments are implemented in which the different shapes of said outer first surface of revolution and of said inner second surface of revolution are such that, when said surfaces of revolution are arranged coaxially and engaged in contact one against the other, they lead to a point-width circular contact line $d_0$ before the elastic deformation stress that results from the shrinkage of the weld between the ends of said outer second branches of the two junction parts when the weld cools.

More particularly, said inner second surface of revolution is not inscribed in the same frustoconical envelope as said outer first surface of revolution, where the term "same frustoconical envelope" is used herein to mean a frustoconical envelope having the same angle at the apex.

In a first variant embodiment, said outer first surface of revolution is a frustoconical surface having a half-angle at the apex $\alpha_1$ that is less than the half-angle at the apex $\alpha_2$ of said frustoconical inner second surface of revolution, where $\alpha_1$ and $\alpha_2$ are less than 45°, preferably lying in the range 30° to 35°.

Preferably, in order to obtain an inner second branch of smaller stiffness, the thickness of said male inner second branch of said first junction part decreases going from the bottom of said annular second cavity to its longitudinal end.

In an advantageous embodiment, the longitudinal end of said male inner second branch of said first junction part includes at its longitudinal end beside its inner face a chamfered termination inclined at an angle β relative to the axial longitudinal direction, the angle of inclination β of said chamfered end being greater than the half-angle at the apex $\alpha_1$ of said frustoconical outer first surface of revolution.

This embodiment enables the stiffness of said male inner second branch of smaller stiffness to be adjusted in such a manner that the stiffness of its end is specifically slightly increased relative to a non-chamfered end (i.e. an end that terminates with an angle of inclination $\alpha_1$ relative to said axial longitudinal direction). This stiffness lies between excessive stiffness at which the elastic deformation stress would be insufficient, not accommodating shrinkage of the weld, an excess flexibility that would not make it possible to adjust the initial spacing between the ends of said outer second branches before they are welded together.

In a variant embodiment, said outer first surface of revolution presents a frustoconical shape continuing at the inner end of said inner second branch in the form of a toroidal surface having the same axis of revolution XX', with its convex side facing towards said inner second surface of revolution of frustoconical shape.

It can be understood that the half-angles at the apex $\alpha_1$ and $\alpha_2$ of said first and second frustoconical surfaces must be such that said inner first surface of revolution and said outer second surface of revolution do not come into contact with each other and therefore do not interfere with each other, apart from said toroidal surface at the end of the outer first surface of revolution. This always applies if said angle at the apex $\alpha_1$ of said outer first surface of revolution is less than or equal to the angle of the apex $\alpha_2$ of said frustoconical inner second surface of revolution. However, this may also apply if the angle $\alpha_1$ of said outer first surface of revolution in its frustoconical portion is greater than the half-angle at the apex $\alpha_2$ of said frustoconical inner surface of revolution.

More preferably, the end of the inner second branch of the first junction part is set back in said axial longitudinal direction XX' relative to the end of the outer second branch of the first junction part, and the end of the outer second branch of the second junction part is set back in the axial longitudinal direction relative to the end of the inner second branch of the second junction part, which is of stiffness that is greater than the stiffness of the inner second branch of the first junction part.

This embodiment makes it possible to protect the reduced-stiffness end of the inner second branch of the first junction part 1a while joining the two junction parts together.

The present invention also provides a method of joining an assembly of at least two coaxial pipes according to the invention, the method being characterized by:

1) joining together, preferably in a J-lay tower, a first coaxial pipe assembly n–1, preferably inclined in suspension at the bottom end of a said J-lay tower, having a said first junction part at its upstream end, and a unit element of a second said coaxial pipe assembly n, that is preferably inclined at the bottom end of a said J-lay tower, having at its downstream end, a second junction part different from said first junction part, whereby the first contact of said second junction part with said first junction part takes place via a circular line of contact $d_0$ between said outer first surface of revolution and said inner second surface of revolution, said two outer second branches of said first and second junction parts preferably being of the same thickness, the front end faces of said outer second branches of said first and second junction parts being spaced apart by a distance of at least 1 mm, and preferably of 2 mm to 5 mm; and 2) making a weld between the end faces and the chamfers at the free ends of said outer second branches only of said first and second junction parts of said two pipe unit elements n–1, n.

Thus, after the weld has shrunk, metal-on-metal sealing is obtained that results from elastic deformation stress at the contact zone between said outer first surface of revolution of said male inner second surface of revolution and said inner second surface of revolution and said female inner second branch.

According to preferred and advantageous characteristics of the invention:

the free end of said outer second branch presents a shape that is preferably chamfered, making it suitable for being welded to the free end of another said outer second branch of another junction part to which it is to be joined, said other junction part itself being joined to the end of a second said assembly element of two coaxial pipes; and the two said outer second branches of the two said junction parts that are to be joined together by welding have the same thickness, and thickness greater than the thickness of the outer pipe of the PiP, preferably thickness greater than the thickness of said inner second branch of said junction part; and the end of said outer second branch presents a chamfer facing outwards, suitable for enabling welding to be performed from the outside; and the free ends of said outer and inner first branches present a preferably-chamfered shape enabling them to be welded to the free ends respectively of said outer and inner pipes, and preferably suitable for being welded respectively from the outside of said outer pipe for said outer first branches and from the inside of said inner pipe for said inner first branches.

In a particular implementation, said first and second annular cavities are oblong in shape in longitudinal section, their bottoms presenting a curved shape and preferably having identical radii of curvature.

Still more particularly:

the bottoms of said first and second cavities are spaced apart by a length lying in the range 0.5 to 5 times the maximum thickness of said junction forging in said solid zone; and the length of said inner and outer first branches forms a said first cavity having a depth lying in the range 1 to 5 times the thickness of the inner and outer pipes, respectively: and the length of said outer and inner second branches forms a said second cavity of depth lying in the range 1 to 5 times the thickness of said outer second branch; and the thickness of said outer second branches is 5% to 100%, preferably 30% to 70% greater than the thickness of the outer pipe.

According to particular characteristics of a method of joining together two assembly elements of two coaxial pipes of the invention:

the length whereby the ends of said inner and outer second branches project relative to each other in a said first junction part is suitable for matching the length whereby the ends of said inner and outer second branches project relative to each other in a said second junction part to which said first junction part is assembled; and said outer and inner second branches of each of the two said junction parts are such that their ends are substantially at the same level in said axial longitudinal direction XX'.

BRIEF DESCRIPTION OF THE DRAWINGS

Other characteristics and advantages of the present invention appear in the light of the following detailed description with reference to the following figures, in which:

FIG. 6 is a side view of an undersea pipe laying ship 13 fitted with a J-lay tower 12;

FIG. 6A shows a new string n approaching the already-assembled pipe portion n−1 suspended from a J-lay tower; and FIG. 6B shows the welding of said new segment n to the pipe n−1 suspended from the bottom end of a J-lay tower.

DETAILED DESCRIPTION OF THE PRESENTLY PREFERRED EMBODIMENTS

Figure 1A:
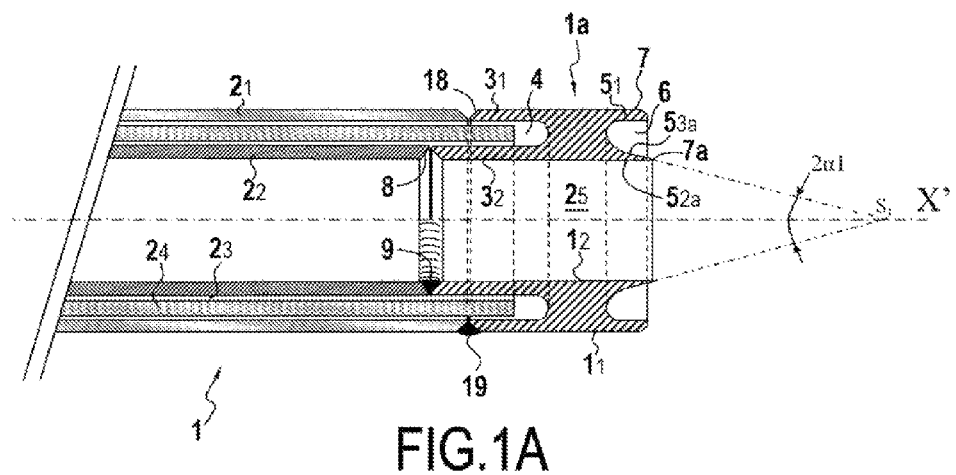
FIG. 1A is an axial longitudinal section of a string n−1 of a PiP 1, including a first junction part 1a welded to its end.

The junction parts 1a and 1b of the invention are substantially cylindrical bodies of revolution and are for joining together two unit elements n−1 and n of an assembly of at least two coaxial pipes, each element comprising an outer pipe $2_1$ containing an inner pipe $2_2$ and defining an annular space $2_3$ containing lagging material $2_4$, the annular space preferably being under reduced gas pressure, said elements being referred to below as unit lengths of PiP.

Said junction parts 1a and 1b are defined as follows:

in a radial direction relative to a longitudinal axis XX' of symmetry of said part, it is defined by a cylindrical inner wall $1_2$ of substantially the same diameter as the intermediate portion of said inner pipe $2_2$, and by a cylindrical outer wall $1_1$ of diameter substantially equal to the outside diameter of the intermediate portion of said outer pipe $2_1$; and in the direction of the longitudinal axis XX':

on the end of said junction part that is to be joined by welding 9 to the ends of said outer and inner pipes of a said element of an assembly of at least two coaxial pipes, said outer and inner walls $1_1$, $1_2$ of said junction part forming in longitudinal section respective outer and inner first branches $3_1$, $3_2$ of substantially the same thickness as said outer and inner pipes $2_1$, $2_2$ to which they are to be joined, said outer and inner first branches $3_1$, $3_2$ defining a first annular cavity 4; and at the opposite end of said junction part that is to be joined to another said junction part, itself connected by welding 9 to the end of another element of an assembly of two coaxial pipes, said outer and inner walls $1_1$, $1_2$ forming in longitudinal section respective outer and inner second branches $5_1$, $5_2$ defining a second annular cavity 6; and the bottoms $4_1$, $6_1$ of said first and second cavities 4, 6 being spaced apart in said longitudinal direction XX' so as to define a massive solid zone 10 of said junction part in which said outer and inner walls $1_1$, $1_2$ form the outer and inner faces of a single cylindrical wall.

Each said unit element n−1 and n of the coaxial assembly of pipes 1 comprises a first said junction part 1a and a second said junction part 1b, which junction parts are different and provided at respective ends.

Figure 2:
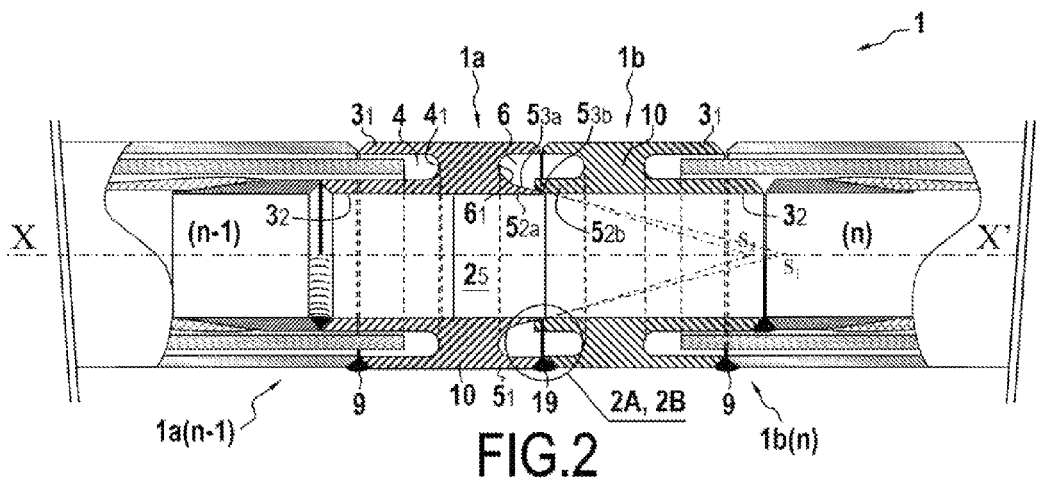
FIG. 2 is an axial longitudinal section of the connection between two PiP length n and n−1, each fitted with a respective junction part 1a (n−1) and 1b (n) at their ends.
Figure 2A:
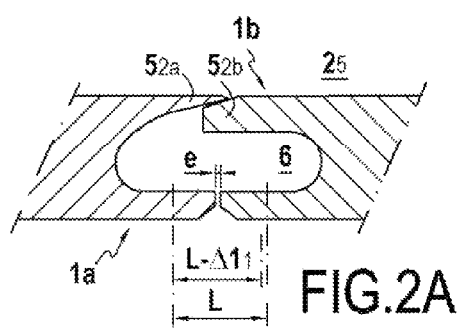
FIGS. 2A and 2B show variant embodiments of the ends of the inner second branch $5_2a$ of the first junction part 1a and its contact with the inner second branch $5_2b$ of the second junction part 1b.
Figure 2B:
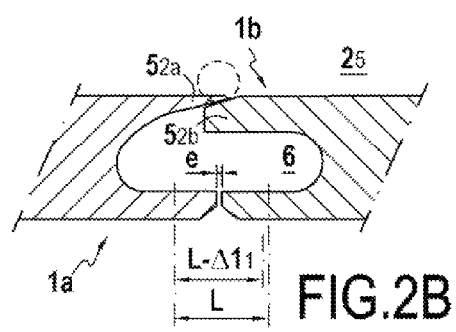

As shown in FIG. 2, the first annular cavity 4 is open to the annular space $2_3$ and can receive the lagging material $2_4$ so as to continue insulating the pipe as far as possible.

In FIG. 2 et seq., the upstream end of a first unit length of PiP n−1 is fitted with a first junction part 1a and the downstream end of a second length of PiP n is fitted with a second junction part 1b. The ends beside their front faces 7 and said outer second branches $5_1$ of each of said first and second junction parts 1a and 1b have the same shape and are butt-joined and welded together. In contrast, said inner second branches $5_2a$ and $5_2b$ of the first and second junction parts 1a and 1b are of different shapes, and their ends are not welded together.

Said inner second branch $5_2a$ of the first junction part 1a upstream from the last unit length of the already-assembled PiP presents thickness that decreases continuously from the bottom $6_1$ of said second cavity 6 towards its upstream free end. This inner second branch $5_2a$ of said first junction part 1a presents an outer surface of revolution $5_3a$ beside its free end 7a that is conical in shape with a half-angle at the apex $\alpha_1$ of about 30° and an inside surface $5_2c$—i.e. facing towards the inside $2_5$ of the inner pipe $2_2$—that is cylindrical in shape, said surface of revolution $5_3a$ and said cylindrical surface $5_2c$ having the same axis XX' as the PiP.

The inner second branch $5_2b$ of the second junction part 1b at the downstream end of a new unit length of PiP or of a new string n for joining to said first junction part 1a is of a shape that is different, i.e. it presents a reduction of thickness at its free end, but its thickness does not diminish from the bottom $6_1$ of its said second cavity 6 as it does for the inner second branch $5_2a$ of the first junction part.

Overall, the thickness of said inner second branch $5_2b$ of the second junction part 1b is greater and presents stiffness and a second moment of area ("inertia") that are greater than those of said inner second branch $5_2a$ of the first junction part 1a.

Furthermore, the end of the inner second branch $5_2b$ of the second junction part 1b presents an inner second surface of revolution $5_3b$ presenting a half-angle at the apex $\alpha_2$ that is greater than $\alpha_1$ and that is pressed facing said outer first surface of revolution $5_3a$ of said inner second branch $5_2a$ of the first junction part 1a.

The first junction part 1a thus comes with its inner second branch $5_2a$ on the inside of the pipe relative to the inner second branch $5_2b$ of the second junction part 1b against which it makes metal-on-metal contact when said outer second branches $5_1$ are assembled by welding 19. Thus, the first junction part 1a and its inner second branch $5_2a$ constitute respectively a first male junction part and an inner second male branch $5_2a$, while the second junction part 1b and its inner second branch $5_2b$ constitute respectively a female junction part and an inner second female branch.

In FIGS. 1 and 2, the free ends of the inner second branches $5_2a$ and $5_2b$ project beyond the free ends of the outer first branches $5_1$ of the two junction parts, so that said frustoconical outer first surface of revolution $5_3a$ of the first junction part 1a overlaps the frustoconical inner second surface of revolution $5_3b$ of the inner second branch $5_2b$ of the second junction part 1b, as explained below.

Figure 5:
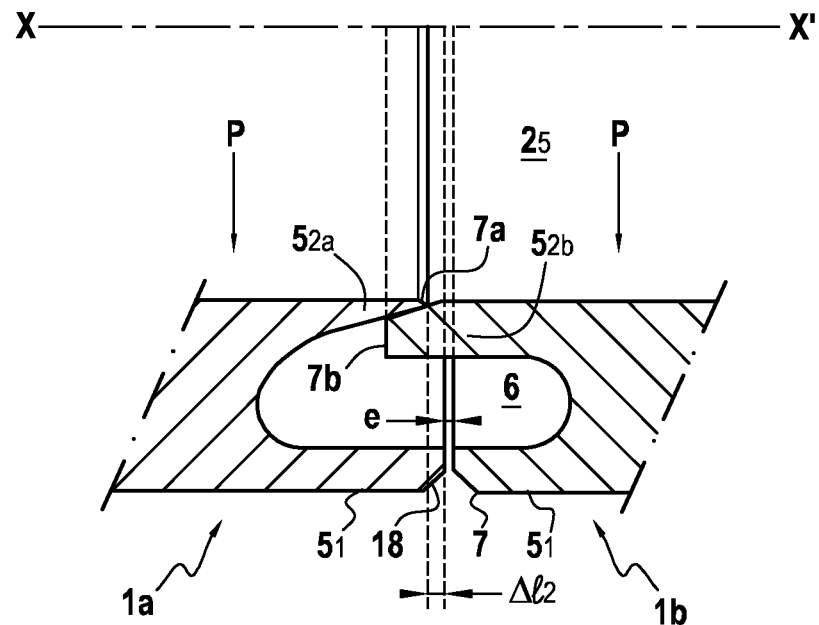
FIG. 5 shows a preferred variant embodiment of the embodiment of the inner second branch $5_2a$ of the first junction part 1a, said end being set back in the direction XX' relative to the end of the outer second branch $5_1$.

In a preferred embodiment as shown in FIG. 5, the inner second branch $5_2a$ of the first junction part 1a presents thickness that tapers progressively from the bottom $6_1$ of the cavity 6 towards its free end. The free end of the inner second branch $5_2a$ is set back by $\Delta l_2$ in the longitudinal direction XX' relative to the front face 7 of the free end of the outer second branch $5_1$ of the same first junction part 1a so that end 7a of the more-fragile inner second branch $5_2a$ is protected during the stage of assembly with the second junction part 1b. In this embodiment of FIG. 5, in order to enable the two inner second branches $5_2a$ and $5_2b$ of the first and second junction parts 1a and 1b to overlap, the end of the inner second branch $5_2b$ of the second junction part 1b is in front relative to the end of the outer second branch $5_1$ of the second junction part.

Figure 5A:
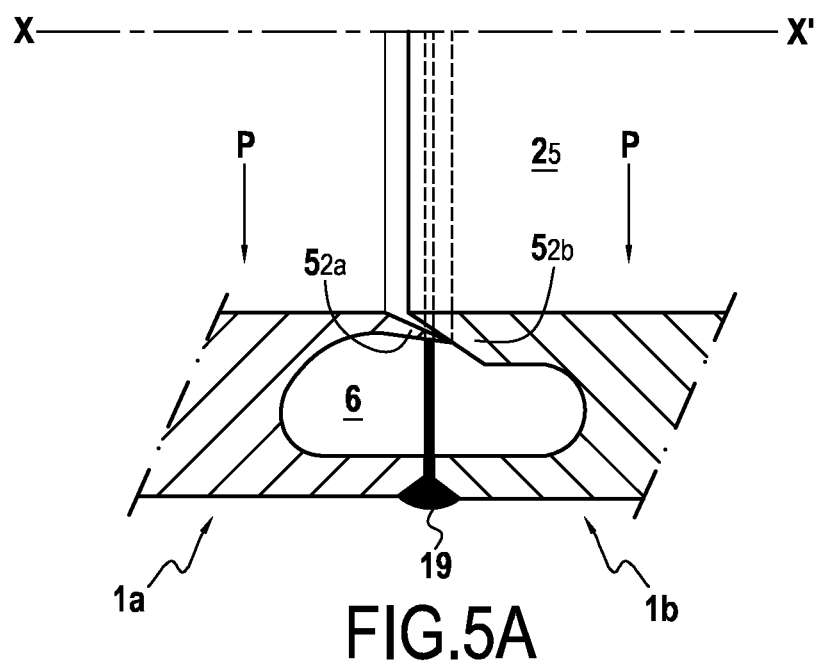
FIG. 5A shows an embodiment in comparison with FIG. 3 in which the cavity 6 is not properly sealed in operation when the pressure of the fluid on the inside $2_5$ of the inner pipe $2_2$ flows at a pressure that deforms the unsupported thin end of the inner second branch $5_2a$ of the first junction part 1a so that it deforms towards the inside of the cavity 6.

According to the present invention, the inner second branch $5_2a$ of the male first junction part 1a is arranged towards the inside $2_5$ of the pipe relative to the inner second branch $5_2b$ of the female second junction part 1b so that the internal pressure of the fluid flowing in the inside $2_5$ of the PiP does not deform the inner second branch $5_2a$ as would happen in a comparative embodiment shown in FIG. 5A. In FIG. 5A, the inner second branch $5_2a$ of smaller thickness and lesser stiffness is situated on the outside, i.e. towards the inner cavity 6 relative to the inner second branch $5_2b$ of the second junction part 1b, which junction part then acts as a male junction part relative to the female first junction part 1a.

After two unit lengths of PiP fitted with forged junction parts of the invention have been assembled and connected together, the second annular cavity 6 of a first junction part 1a at the upstream end of a first length of PiP is open to a second annular cavity of a second junction part 1b at the downstream end of a second length of PiP, thus forming a chamber formed by welding together the ends of the outer second branches $5_1$.

The chamber 6 is leaktight since although the ends of the inner second branches $5_2a$ and $5_2b$ of the two junction parts 1a and 1b are not welded together, they present facing surfaces $5_3a$ and $5_3b$ that give rise to a metal-on-metal contact zone 11 under elastic deformation stress, as explained below.

Figure 1B:
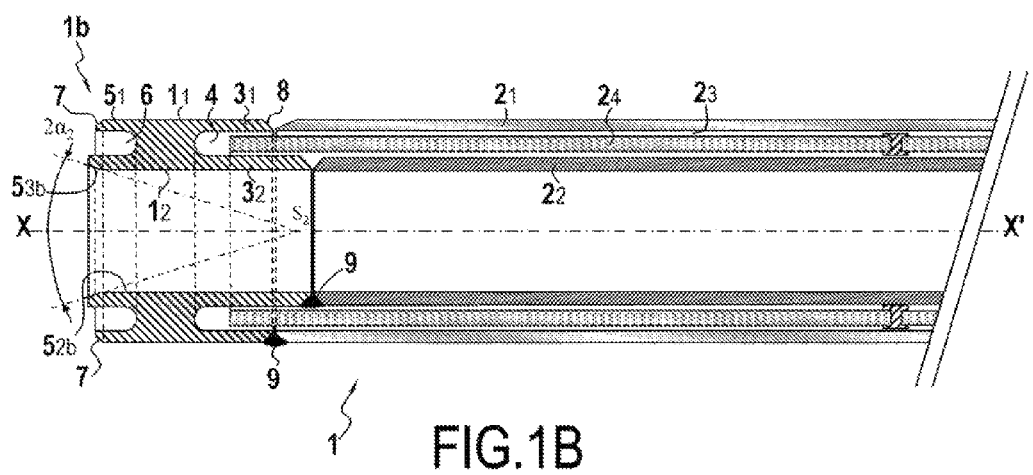
FIG. 1B is an axial longitudinal section of the second end of the same string of a PiP 1 as shown in FIG. 1A, including a second junction part 1b welded to its end.

The free ends of said outer and inner first branches $3_1$ and $3_2$ present a shape with a chamfer 8 thus enabling a so-called "full penetration" first welding pass to be performed followed by complete filling of the chamfer as shown at 9. In FIG. 1A, the chamfers 8 face towards the outside and are therefore suitable for being welded together from the outside of said outer and inner pipes $3_1$ and 32. In FIG. 1B, the chamfers 8 face towards the outside of the end of said outer first branch and towards the inside at the end of said inner first branch, making them suitable respectively for being welded together from outside said assembly for said outer first branches, and from inside said inner pipe for said inner first branches.

For clarity in description, FIGS. 1A, 1B, and 2 show the various component elements welded together in the bottom halves thereof, and positioned face-to-face prior to the welds 9 being made in the top halves thereof.

In FIG. 2, the free ends of said outer second branch $5_1$ present the shape of a chamfer 18 facing towards the outside of a first junction part 1a, making it suitable for being welded from the outside to the free end of another said outer second branch of another junction part 1b to which it is to be joined, said other junction part itself being at the end of a second element of an assembly of two coaxial pipes.

In said first and second forged junction parts 1a and 1b, the end of said inner first branch $3_2$ at the end of said junction part that is suitable for being connected directly to a said element of a said coaxial pipe assembly projects in said longitudinal axial direction XX' relative to the end of a said outer first branch $3_1$ in such a manner that said junction parts can be connected by being welded to a said coaxial pipe assembly in which the end of said outer pipe projects relative to the end of said inner pipe.

In a preferred version of the invention, said first and second forged junction parts 1a-1b are made as shown in FIG. 2 and present outside diameters and wall thicknesses that are substantially equal, and preferably equal to the corresponding dimensions of the intermediate portion of the outer envelope.

By proceeding in this way, the pipe presents, over its entire length, an inertia that is substantially constant, thus avoiding accumulation of stress at the joins between two unit lengths of PiP, and considerably improving the bending and fatigue behavior of the pipe, thereby enabling it to survive throughout the lifetime of installations, particularly when used in bottom-surface connections that are subjected to the effects of swell and current, which lifetime can reach and exceed 30 years.

To avoid undesirable vortex phenomena at the join between two forged junction parts $1a$ and $1b$ of two adjacent portions of PiP, when crude oil is flowing inside the inner pipe, the inside diameter of the forged junction part $1a$ is extended as far as the junction face with the corresponding part $1b$, but the junction is not welded so as to avoid phenomena of transferring load and stresses between the outer envelope and the inner pipe, which would run the risk of leading to cracking or to fatigue phenomena that would inevitably lead to the complete failure of the pipe. The two extensions of the inner portion thus serve merely to provide continuity in the inside diameter of the inner pipe and they can be machined in numerous ways.

FIG. 1A is a longitudinal section of a first junction part $1a$ at the upstream end of an end string n-1 of an already-assembled pipe presenting first conical machining at the free end of its inner second branch $5_2a$, which first conical machining forms a frustoconical outer first surface of revolution $5_3a$ having an apex $S_1$ and a half-angle at the apex of $\alpha_1$.

In FIG. 1B, there can be seen a longitudinal section of an end of a second junction part $1b$ of a new string n presenting second conical machining at the end of its inner branch $5_2b$, which second conical machining forms a second surface of revolution $5_3b$ of frustoconical shape having an apex $S_2$ and a half-angle at the apex of $\alpha_2$, the inner second branch $5_2b$ being thicker and thus stiffer than the inner second branch $5_2a$.

The angles $\alpha_1$ and $\alpha_2$ are such that $\alpha_1 < \alpha_2$, with the difference between the angles lying in the range 0.5° to 5°, and preferably in the range 1° to 2°, with $\alpha_1$ preferably being equal to 30°. Thus, when the string n is caused to approach the string n-1 along an axial longitudinal axis XX', the female conical end of the conical inner second surface of revolution $5_3b$ of the string n co-operates with the male conical downstream end of the conical outer first surface of revolution $5_3a$ of the string n-1, covering it on the outside, i.e. on the side of said inner cavity 6. This ensures that the two pipe portions are accurately coaxial without it being necessary to perform any lateral adjustment. Said outer first surface of revolution $5_3a$ of the first junction part $1a$ and said inner second surface of revolution $5_3b$ of the second branch $5_2b$ of the second junction part $1b$ are machined so as to adjust the cone angles $\alpha_1$ and $\alpha_2$ at the apexes $S_1$ and $S_2$ in such a manner that when they overlap, after contact has been made between the two surfaces $5_3a$ and $5_3b$ of the approaching strings n and n-1, the front faces 7 of the two outer branches $5_1$ of the two junction parts $1a$ and $1b$ are spaced apart from each other by a distance e lying in the range 1 mm to 4 mm that is optimized for making the joining weld 19.

The spacing between the parallel front faces 7 of the two chamfers 18 at the ends of the two outer second branches $5_1$ of two junction parts $1a$ and $1b$ must be extremely accurate so that the welding 19 between the ends of the two outer second branches $5_1$ can be performed in normal manner with full penetration and thus present optimized strength.

Figure 3:
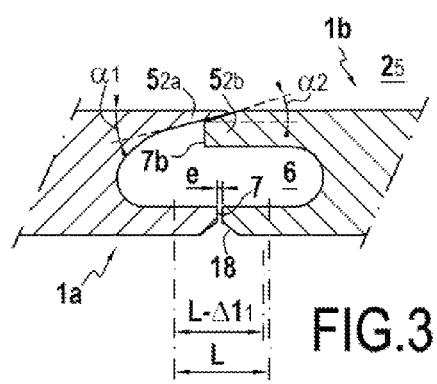
FIGS. 3, 3A, and 3B show in detail how the connection point of the end of the first junction part 1a in FIG. 2A varies respectively at the end of the approach stage of the two unit pipe elements n−1, and n, when the upper string n is resting on the lower string n−1 (FIG. 3A) and after the welding metal has shrunk once the weld has cooled (FIG. 3B)

FIG. 3 is a second view of the connection between the male and female cones $S_1$ and $S_2$ at the ends of the forgings $1a$ and $1b$.

Figure 3A:
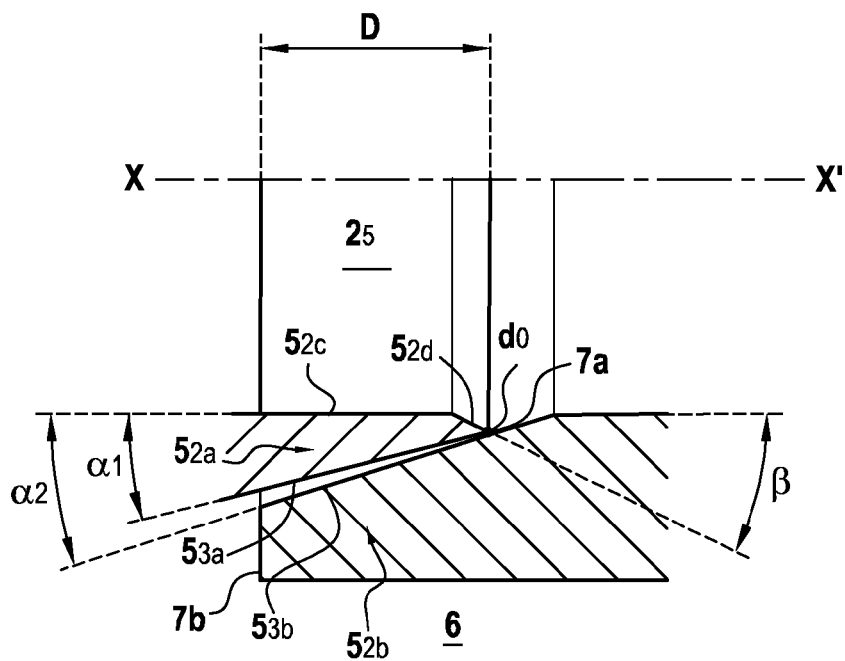

In FIG. 3A, the string n is approaching the string n-1, the free end of the inner second branch $5_2a$ of the first junction part $1a$ just making point contact $d_0$ with the free end of the inner second branch $5_2b$ of the second junction part $1b$. The contact distance in longitudinal section or in projection onto the axis XX' constitutes a point, i.e. in the proximity of the ends $7a$ and $7b$ of said inner second branches $5_2a$ and $5_2b$, the contact between the surfaces $5_3a$ and $5_3b$ is initially restricted to the trace $d_0$ of a circle.

Figure 3B:
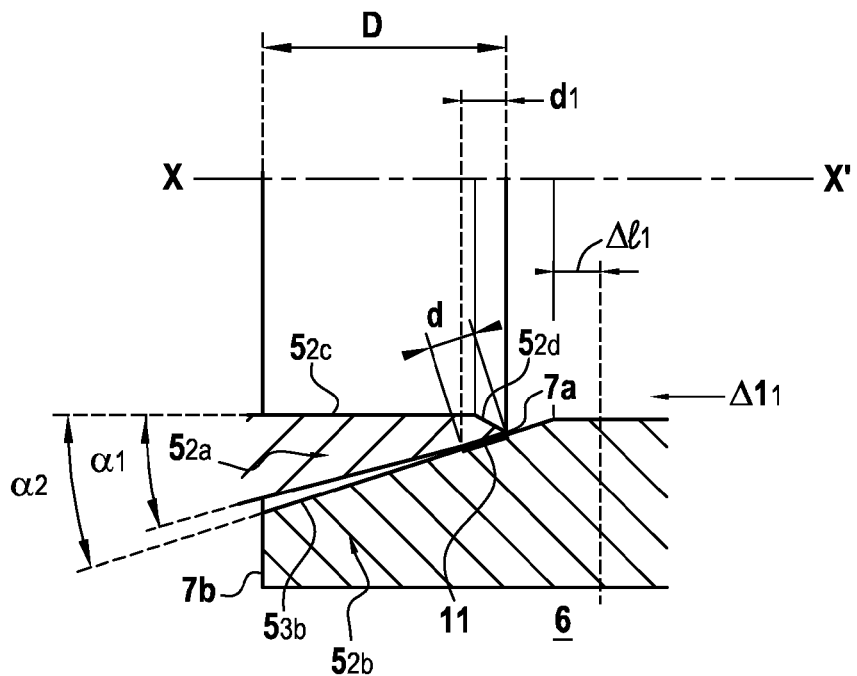

In FIG. 3B, the string n is resting on the string n-1, the assembly being in the inclined position within a J-lay tower 12 installed on board a laying ship 13, as shown in FIGS. 6 and 6A. Thus, since the assembly is inclined, the string n applies its weight onto the string n-1 and the contact zone between the male cone $S_1$ and the female cone $S_2$ increases somewhat as a result of the elastic deformation stress on the surfaces $5_3a$ and $5_3b$, thereby constituting a substantially conical surface 11 of small width d. This contact surface 11 is due to elastic deformation of the respective walls $5_3a$ and $5_3b$ of said male and female cones $S_1$ and $S_2$, and essentially to elastic deformation of the less stiff wall of the male cone $S_1$.

Once the approach has terminated, the outer circular welding is performed in known manner using an orbital device 14 as shown in FIG. 6B, and after said weld has cooled, the shrinkage due to the cooling of the weld moves the string n towards the string n-1 a little, through a distance $\Delta l_1$, thereby having the effect of increasing the width d of the contact surface 11 between the male cone $5_3a$ and the female cone $5_3b$ up to d having a value lying in the range 0.5 mm to 5 mm, and preferably in the range 2 mm to 4 mm. This contact surface 11 is due to elastic deformation of the respective walls of said male cone $5_3a$ and of same female cone $5_3b$, with the elastic deformation of the male cone $S_1$ $5_3a$ being much more pronounced, since its section at the end is much smaller and weaker than that of the female cone $S_2$ $5_3b$.

The shrinkage $\Delta l_1$ of the weld 19 at the ends of the outer second branches $5_1$ of the two junction parts $1a$ and $1b$ depends on the characteristics of the pipe, but it may be of millimeter order, thereby giving rise to deformation of the conical contact zone 11 of the order of d=2 mm to 4 mm, depending on the angle $\alpha$, i.e. the mean value of the cone angles of the male and female cones.

The fact that the two forgings $1a$ and $1b$ are machined with precision and repeatably from one part to the next means that this peripheral elastic deformation gives rise to metal-on-metal leaktight sealing between the end of the string n and the end of the string n-1, in the inner pipe.

Since the deformation remains in the elastic range, the sealing continues to be perfectly leaktight throughout the lifetime of the pipe, thereby ensuring under certain critical operating conditions that there is no filling of the space 6 situated between the inner branches $5_2a$, $5_2b$ and outer branches $5_1$ at the end of the first and second junction parts $1a$ and $1b$.

Figure 4:
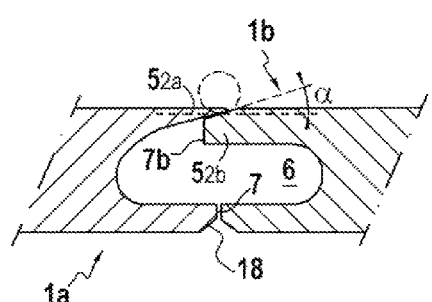
FIGS. 4, 4A, and 4B show details of how the connection point at the ends of the junction parts of FIG. 2B vary respectively at the end of a stage of approaching the two pipe elements, then while the upper string is resting on the lower string (FIG. 4A), and then after the metal has shrunk as a result of the weld cooling (FIG. 4B)
Figure 4A:
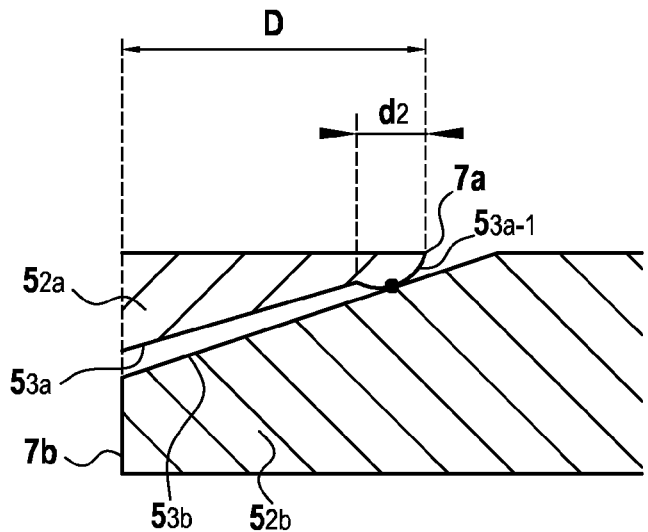
Figure 4B:
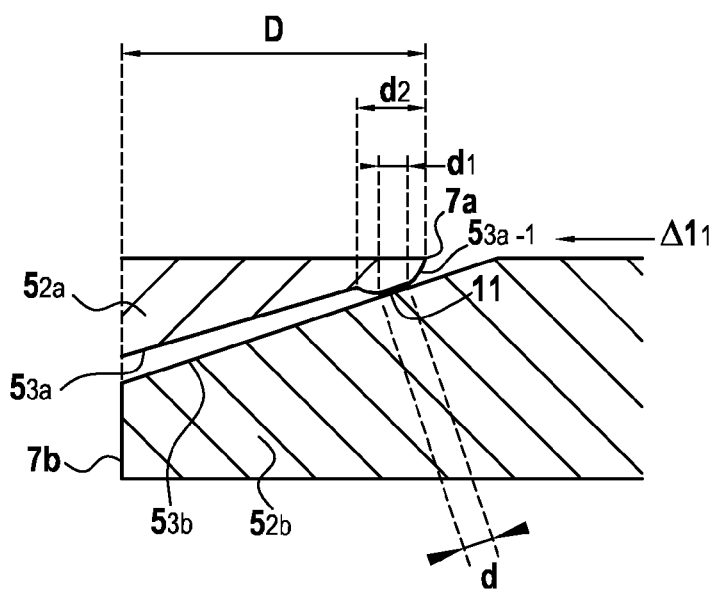

In FIGS. 4 and 4A, there can be seen a variant $5_3a$-1 for the machining of the end of the outer first surface of revolution $5_3a$ of the inner second branch $5_2a$ of the first junction part $1a$. Indeed, if the inner second surface of revolution $5_3b$ of the inner second branch $5_2b$ of the second junction part $1b$ is machined to form a cone $5_3b$ of apex $S_2$ and angle $\alpha_2$, then the end of the outer first surface of revolution $5_3a$ of the first junction part $1a$ is machined in the future contact zone 11, not in the form of a cone but in the form of a portion of a torus $5_3a$-1 having the same axis XX', and preferably of elliptical longitudinal section, and even more preferably of circular longitudinal section. Thus, at the end of the approach stage, as shown in FIG. 4A, the peripheral contact is still restricted to a circle, but when the string n rests on the string n−1 the contact surface 11 between the two surfaces $5_3a$ and $5_3b$ continues to present a point-width trace $d_0$ of circular shape. Furthermore, after welding and after the weld 19 has cooled, because of the elastic deformation stressed at the contact between the ends $5_3a$-1 and the surface $5_3b$, the contact surface 11 still becomes substantially a portion of a cone presenting a generator line of length d, as shown in FIG. 4B, thereby ensuring perfect sealing for the volume of the chamber formed by the two cavities 6 extending between the inner second branches $5_2a$, $5_2b$ and the outer second branches $5_1$ of the two complementary forgings 1a and 1b. The length d is such that its length $d_1$ in projection onto the axis XX' continues to remain shorter than the length D in projection onto the axis XX' of the overlap zone between said first and second surfaces of revolution $5_3a$ and $5_3b$ of the two inner branches $5_2a$ and $5_2b$ of the two joined-together junction parts 1a and 1b, and less than the length $d_2$ of the projection onto XX' of the toroidal inner first surface of revolution $5_3a$.

This toroidal termination $5_3$-1 of the outer first surface of revolution $5_3a$ serves to thicken a little the termination of the less stiff and therefore weaker inner second branch $5_2a$, thereby adjusting the spacing e between the ends of the two branches $5_1$ of the two junction parts to be adjusted so as to enable welding to take place under optimum conditions.

In a variant embodiment, shown in FIG. 3A, the relative thickening of the free end of the outer first surface of revolution $5_3a$ is obtained by chamfering its inner face $5_2d$ so that said inner face $5_2d$ is inclined at an angle β relative to the axis XX' that is greater than the half-angle at the apex $α_1$ of the remainder of the frustoconical surface $5_3a$.

In FIG. 4A, the remainder of the outer first surface of revolution $5_3a$, i.e. the front portion of the toroidal end $5_3a$-1 (i.e. the portion downstream from the toroidal end $5_3a$-1) remains conical. Because the conical outer first surface of revolution $5_3a$ is spaced further apart from the conical inner second surface of revolution $5_3b$, it is not necessary for $α_1$ to be less than or equal to $α_2$ under such circumstances, since it suffices for the two conical surfaces of revolution $5_3a$ and $5_3b$ not to come into contact, and thus interfere with each other only via the toroidal end $5_{3a-1}$.

In the present invention, a pipe string is described that presents a female conical shape $5_3b$ at one end and a complementary male shape $5_3a$ at the other end, which shape may be conical or toroidal in the future contact zone 11 between two adjacent strings, however it would remain within the spirit of the invention to use a surface of revolution for the male end and/or for the female end presenting any other shape, that may be spherical, paraboloidal, hyperboloidal, or any other surface of revolution, it being understood that the contact zones are respectively: of point-width $d_0$, at the end of the approach stage (FIG. 3A) when the string n rests on the string n−1; and present a geometrical surface of revolution about the axis XX' having a generator line of length d, after shrinkage due to welding (FIG. 3B).

All of these various shapes are extremely simple to machine when using numerically controlled automatic lathes for finishing the end forgings, which parts can be made with precision and with extreme care.

The outside diameter of said first outer wall $1_1$ generally lies in the range 150 mm to 750 mm or even more, with the inside diameter of said inner wall $1_2$ of said junction part lying in the range 50 mm to 700 mm.

By way of example, a PiP constituted by an inner pipe having an inside diameter of 203.2 mm and thickness of 16.3 mm, and an outer pipe having an inside diameter of 293.05 mm and thickness of 15.4 mm presents a cross-section whose "inertia" about its center is 245, 984, 742 $mm^4$.

And, according to the invention, a forged part without an additional sleeve, presents wall thickness at the joining weld between two unit lengths of PiP equal to 22.83 mm, i.e. said outer second branches must have a thickness of 22.83 mm.

Thus, the thickness of the forged junction part of the invention, at the outer second branch, remains reasonable and is substantially greater than the thickness of the outer pipe, without it being necessary to fit an additional sleeve, where such a sleeve does not guarantee reliability over time.

The invention claimed is:

1. An assembly of at least two coaxial pipes constituted in a main portion by an outer pipe and an inner pipe defining an annular space preferably containing lagging material, the assembly being constituted by assembling together unit elements of at least two coaxial pipes, comprising at least two coaxial pipe assembly unit elements, one of which has, at at least one end, a first junction part joined to a second junction part at the end of another said coaxial pipe assembly unit element, each of said first and second junction parts being a body of revolution defined as follows:

in a radial direction relative to a longitudinal axis XX' of symmetry of said part, it is defined by a cylindrical inner wall of substantially the same diameter as the intermediate portion of said inner pipe, and by a cylindrical outer wall of diameter substantially equal to the outside diameter of the intermediate portion of said outer pipe; and in said direction of the longitudinal axis XX'
on the end of said junction part that is joined by welding to the ends of said outer and inner pipes of a said unit element of an assembly of at least two coaxial pipes, said outer and inner walls of said junction part forming respective outer and inner first branches in longitudinal section, said outer and inner first branches defining a first annular cavity; and
at the opposite end of said junction part where it is joined to another said junction part, itself connected by welding to the end of said another unit element of an assembly of two coaxial pipes, said outer and inner walls forming in longitudinal section respective outer and inner second branches defining an internal second annular cavity;
the two said first and second junction parts being welded to each other solely via the ends of their said outer second branches;
the bottoms of said first and second cavities being spaced apart in said longitudinal direction XX' so as to define a massive solid zone of said junction part in which said outer and inner walls form the outer and inner faces of a single cylindrical wall; and
the ends of said two non-welded-together inner second branches of said first and second junction parts are in metal-on-metal contact with each other under elastic deformation stress via their contact surface, which is a surface of revolution, between an outer first surface of revolution on the outer face of the inner second branch of the first junction part and an inner second surface of revolution on the inner face of the inner second branch of the second junction part, said inner second branch of the first junction part forming a male inner second branch situated inside the female inner second branch of the second junction part, wherein said inner second surface of revolution is of a shape that is different, but of the same axis of revolution as the outer first surface of revolution, such that said outer first surface of revolution and inner second surface of revolution present, when they are arranged coaxially and engaged in contact one against the other, an initial line of contact that is circular and that transforms into said contact surface after said elastic deformation stress resulting from the elastic deformation due to the shrinkage of the weld between the ends of said outer second branches of said two junction parts, so that said internal second cavities are leaktight relative to the inside of the inner pipe.

2. An assembly of at least two coaxial pipes according to claim 1, wherein:
said inner second branch of said first junction part forms a male inner second branch inside the female inner second branch of the second junction part, and said male inner second branch is of stiffness that is less than the stiffness of the female inner second branch; and
said outer first surface of revolution and said inner second surface of revolution are in metal-on-metal contact resulting from elastic deformation on a said contact surface, which surface presents a dimension in projection onto the axial longitudinal direction that is less than the dimension in projection onto the axial longitudinal direction of the overlap zone between said male inner second branch and said female inner second branch.

3. An assembly of at least two coaxial pipes according to claim 1, wherein the length of the generator line of said contact surface of revolution between said outer first surface of revolution and said inner second surface of revolution lies in the range 0.5 mm to 5 mm.

4. An assembly of at least two coaxial pipes according to claim 1, wherein said inner second surface of revolution is not inscribed in the same frustoconical envelope as said outer first surface of revolution.

5. An assembly of at least two coaxial pipes according to claim 1, wherein said outer first surface of revolution is a frustoconical surface having a half-angle at the apex $\alpha_1$ that is less than the half-angle at the apex $\alpha_2$ of said frustoconical inner second surface of revolution, where $\alpha_1$ and $\alpha_2$ are less than 45°.

6. An assembly of at least two coaxial pipes according to claim 5, wherein the thickness of said male inner second branch of said first junction part decreases going from the bottom, of said annular second cavity to its longitudinal end.

7. An assembly of at least two coaxial pipes according to claim 6, wherein the longitudinal end of said male inner second branch of said first junction part includes at its longitudinal end beside its inner face a chamfered termination inclined at an angle $\beta$ relative to the axial longitudinal direction, the angle of inclination $\beta$ of said chamfered end being greater than the half-angle at the apex $\alpha_1$ of said frustoconical outer first surface of revolution.

8. An assembly of at least two coaxial pipes according to claim 1, wherein said outer first surface of revolution presents a frustoconical shape continuing at the inner end of said inner second branch in the form of a toroidal surface having the same axis of revolution XX', with its convex side facing towards said inner second surface of revolution of frustoconical shape.

9. An assembly of at least two coaxial pipes according to claim 1, wherein the end of the inner second branch of the first junction part is set back in said axial longitudinal direction relative to the end of the outer second branch of the first junction part, and the end of the outer second branch of the second junction part is set back in the axial longitudinal direction relative to the end of the inner second branch of the second junction part, which is of stiffness that is greater than the stiffness of the inner second branch of the first junction part.

10. A method of assembling an assembly of at least two coaxial pipes according to claim 1, the method comprising:
1) assembling together a first coaxial pipe assembly, having a said first junction part at its upstream end, and a unit element of a second said coaxial pipe assembly, having at its downstream end, a second junction part different from said first junction part, whereby the first contact of said second junction part with said first junction part takes place via a circular line of contact between said outer first surface of revolution and said inner second surface of revolution, said two outer second branches of said first and second junction parts, the front end faces of said outer second branches of said first and second junction parts being spaced apart by a distance of at least 1 mm; and
2) making a weld between the end faces and the chamfers at the free ends of said outer second branches only of said first and second junction parts of said two pipe unit elements.

* * * * *